3,338,745
METHOD FOR CLEANING EVAPORATOR TUBES

Roy W. Thorn, Jr., Diamond, Donald E. Warren, Joplin, Richard H. Perkins, Carthage, Gale A. Rickman, Joplin, and Donald M. Norris, Carthage, Mo., assignors to W. R. Grace & Co., New York, N.Y., a corporation of Connecticut
No Drawing. Filed July 3, 1963, Ser. No. 292,731
7 Claims. (Cl. 134—22)

ABSTRACT OF THE DISCLOSURE

In abstract, this invention is directed to a method for removing deposits consisting essentially of metal fluosilicates, sulfates, and phosphates from tubes of an evaporator for concentrating wet process phosphoric acid, said process comprising; treating said tubes with a boiling solution of phosphoric acid, said acid solution being unsaturated with scale forming bodies consisting essentially of metal fluosilicates, sulfates, and phosphates and having a $P_2O_5$ concentration within the range of 25–45%, while adding water to maintain the $P_2O_5$ concentration of said boiling acid solution within the aforesaid range, all as recited hereinafter.

---

This is a continuation-in-part of our copending application Ser. No. 134,821, filed Aug. 30, 1961, and now abandoned.

This invention relates to a method for cleaning and descaling tubes in long-tube evaporators used in concentrating phosphoric acid.

One of the oldest and most economical methods for making phosphoric acid for fertilizers and the like is to treat phosphate rock with sulfuric acid, thereby producing a sludge of calcium sulfate and phosphoric acid, from which the phosphoric acid is separated by leaching with water. This method of recovering phosphoric acid is generally known as the "wet process." To make phosphoric acid for any application other than fertilizers, it is often necessary to purify the crude material obtained by the wet process. This purification may amount to simple decolorizing or it may involve the quantitative removal of iron, vanadium, aluminum and gypsum, as in the preparation of a food-grade acid. Because of the high purity obtained by the competing electric furnace process, manufacturers of phosphate chemicals who use wet-process acid have been forced to improve their methods of purification continually.

The crude wet process acid may have a concentration of 25–26% $P_2O_5$. However, this is not high enough for normal uses. Concentration is sometimes carried out with submerged burners or by blowing hot combustion gases through carbon nozzles which are submerged in a shallow stream of acid flowing down a long trough. A more convenient means of carrying it out, however, is a vacuum evaporator of the long-tube vertical type. Such an evaporator is made up of a bundle of tubes enclosed in a housing in such a way that the tubes can be steam heated. The tubes may be from ¾ to 2 inches in diameter and from 8 to 20 feet long. Feed acid is fed into the bottom of the evaporator in such a way that it rises part way through the tubes. At the same time, steam is introduced behind a baffle so that it rises to the top of the tube bundle and passes downward along the tubes. As the phosphoric acid rises in the tubes, it is heated and begins to boil, and thereafter, the velocity of the liquid and the vapor is accelerated by the formation of steam until the mixture leaves the tubes at a relatively high velocity. From the tubes, the material is directed to a flash chamber where entrained liquor drops out and steam exhausts overhead. A return conduit leads from the bottom of the flash chamber to the bottom of the evaporator. In this way, there is continuous thermally induced circulation of hot acid through the evaporator and flash tank. Sufficient feed acid is introduced into the bottom of the evaporator to maintain the level of liquid in the evaporator near the top of the tubes.

In practice, a stream of acid, concentration 54–55% $P_2O_5$, is continuously withdrawn from an upper portion of the flash chamber. A small portion of this stream goes to product storage. The larger portion goes to a blend tank where it is mixed with fresh 26% acid to make an evaporator feed having a $P_2O_5$ content only a few percent below that of concentration acid.

During the heating and evaporating step, substantial quantities of compounds of calcium, iron, and aluminum are precipitated, probably as fluosilicates, sulfates or phosphates. Most of these solids remain in suspension in the concentrated acid and are circulated through the system to the product storage tanks. However, some of the solids (2–3%) are deposited on the inside of the evaporator tubes as a scale. As this deposit builds up, the heat-transfer is reduced and the output of the evaporator drops. Eventually, the efficiency of the evaporator is lowered to the point that the deposit must be removed to restore economical operation.

In phosphoric acid evaporators, the tubes are frequently made of Karbate, a specially bonded carbon which is resistant to attack by the phosphoric acid. Unfortunately, these tubes are relatively brittle and extreme care must be exercised in removing the scale. One procedure has been to remove the deposit by mechanical means, as by grinding. However, any grinding device that will remove deposit can also break the brittle evaporator tubes. When this occurs, it is necessary to close off the broken tubes, which results in reduced efficiency, or to replace them, which is troublesome and time consuming. Either consequence is to be avoided if possible.

Recently, there has been a trend to use evaporator tubes made of metal. Almost any hard metal which is resistant to corrosion from the action of hot phosphoric acid is suitable for this purpose. In particular, effective evaporation has been carried out using Hastelloy C, a nickel-iron-chromium-molybdenum alloy, Ni-o-nel, a nickel-iron-chromium alloy, and several of the high grade, corrosion-resistant stainless steels. But in all of these cases, the problem of deposit build-up is the same as that with Karbate.

Efforts have been made to dissolve the deposit by using various liquid agents, such as caustic soda, sodium carbonate, sulfuric acid, and surface active agents. However, none of these have proven to be satisfactory. In addition, these agents contaminate the system and degrade the phosphoric acid subsequently concentrated during the first few hours of operation.

It is an object of this invention, therefore, to provide a method for cleaning and removing the deposit from the tubes used in phosphoric acid evaporators which is both convenient and inexpensive and which avoids breakage of the tubes or contamination of the system.

We have found that it is possible to dissolve the deposit from the evaporator tubes by treatment with high purity phosphoric acid of somewhat lower $P_2O_5$ content than the product acid from which the deposit was precipitated. We have found even that phosphoric acid previously concentrated in the evaporator can be used for this purpose provided the suspended solids have been removed and the acid is diluted.

As mentioned above, product acid from the evaporator is sent to storage. Upon standing, the suspended solids tend to settle. If the acid is to be used in fertilizer manufacture, the acid is usually agitated to prevent settling since it has been found that the suspended solids aid in granulation. For most other uses, it is desirable that the acid contain a minimum of solids. If the acid is allowed to stand for several hours, a major portion of the solids will settle and clarified acid can be withdrawn overhead.

The acid used for cleaning the evaporator tubes may be any relatively pure phosphoric acid which is not saturated with deposit-forming bodies. For example, furnace acid because of its high purity is quite well suited for this purpose. However, it is not necessary to use furnace acid but clarified wet process acid may be likewise emwise employed. As mentioned above, a major portion of suspended solids will settle on standing and the thus clarified acid if diluted has been found to work quite well for this purpose.

The concentration of acid used in the boil-out is preferably around 38–42%, although a wider range of concentrations (25–45%) can be used with some success. Higher concentrations can be used but, because of their limited capacity to dissolve additional solids, a somewhat lower concentration is dictated. Below about 38% $P_2O_5$ the boil-out acid losses efficiency and longer times are required.

In practicing the present invention, clarified acid usually around 54% $P_2O_5$, is diluted with water to about 40% and a sufficient quantity is introduced into the evaporator and flash tank to fill the system to the top of the evaporator tubes. Steam is introduced into the evaporator in the usual manner and the liquid is brought to a boil, usually under a slight vacuum. Water is continuously fed into the evaporator to maintain the liquid level constant. During the boil-out, circulation of the acid through the system occurs in the usual manner. After several hours of boiling, the acid is withdrawn to dilute acid storage from which it will be brought back into the system through the blend tank. However, it is not necessary to remove this acid and if desired, the water feed can be stopped and dilute acid from the blend tank introduced into the evaporator and the evaporation cycle continued in the usual manner. We prefer to empty the evaporator and flash tank of boil-out acid and, if time permits, to remove the head of the evaporator and inspect the tubes before the system is returned to use. Sometimes, a small amount of deposit will remain in the tubes although it is normally soft and can be flushed by water jet or can be dislodged by a ramrod. Inspection at this stage gives an opportunity to replace any tubes that may have been broken during use.

Normally the evaporators will be brought back on stream by filling it with acid from the blend tank at the normal operating concentration, i.e., a few percent below the final product concentration.

The use of phosphoric acid to remove the evaporator deposit is quite unique, inasmuch as the deposit was originally precipitated from phosphoric acid. However, we have found it to be the most effective of all the agents tried for this purpose. The concentration of the boil-out acid may be between 25–45% $P_2O_5$ although we have found that optimum solvent action is obtained at concentrations around 38–42%. It is especially to be noted that the effectiveness of our invention is entirely independent of the material of which the tubes are made. The reason for this is apparent; the deposite being removed was originally precipitated from the acid going through the tubes, and was not formed as a result of the interaction between the acid and the tubes. Consequently, the composition of the tubes has no bearing upon the nature of the deposit.

The present invention is further explained by the following illustrative examples.

*Example I*

A series of solutions were tested for their effectiveness in removing deposit. Sections of used, discarded Karbate tubes from a Swenson evaporator were placed in beakers along with the solution being tested. All tests were run in 250 ml. beakers on hot plates with the solution level held constant by adding distilled water during the simulated "boil out." The conditions of scale at the end of a 6 hour period are recorded below.

| Solution | Concentrations Used (Percent) | Rating [1] |
|---|---|---|
| Ammonium Oxalate | 5, 10, 25 | 3 |
| Ammonium Citrate | 5, 10, 15 | 4 |
| Citric Acid | 5, 10, 15, 20 | 1 |
| Sodium Chloride | 5, 10, 15, 20, 25 | 0 |
| Sodium Fluoride | 5 | 1 |
| Potassium Chloride | 5, 15, 25 | 0 |
| Sulfuric Acid [2] | 1, 2, 5 | 2 |
| Hydrochloric Acid [2] | 1, 2, 5 | 2 |
| Sodium EDTA | 1, 2, 5, 10, 20, 40 | 1 |

[1] Rating scheme: 0—no observable effect; 1—unsatisfactory, little improvement; 2—results noticeable put poor; 3—fair deposit removal; 4—good deposit removal; 5—excellent deposit removal.
[2] Acid concentrations were limited by practical considerations.

All the above tests, with the exception of sodium EDTA, were repeated using a 50% volume-to-volume glycerine-water solution instead of water. The results were the same as those obtained in the first series.

*Example II*

The procedure in Example I was followed for a series of concentrations of phosphoric acid with the following results.

Concentration (percent $P_2O_5$): Rating
85 ---- 1
50 ---- 3
40 ---- 5
30 ---- 4
25 ---- 3
15 ---- 2

As well, a water boil out was carried out on each of the above. There was little or no additional effect.

*Example III*

A pilot unit was set up to determine the usefulness of various solutions to dissolve the deposit in evaporator tubes. With it, it was possible to duplicate conditions in the evaporator for evaluation studies. Essentially, it was a 1-tube evaporator unit, set up to run under vacuum with thermal circulation. Temperature conditions were closely regulated to simulate those actually present in the Swenson evaporator. The success of the invention at hand is demonstrated by the two following tests:

(a) A 38% $P_2O_5$ solution was run through the unit for 8 hours at 140° F. The solution turned dark after only 3 minutes of running time. Water was added throughout the run to maintain the acid strength at 38%.

At the end of the run, the tube was almost entirely clean. The solution was viscous and upon settling contained about 10% precipitate by volume.

The solution was boiled down in the laboratory to a strength of 51% $P_2O_5$ with about a 5% increase in solids. With little difficulty it could have been reconcentrated, the remaining impurities precipitating out, and added to the product concentrated acid from the evaporator.

(b) A 40% $P_2O_5$ solution was run through the unit for 8 hours at 145° F. The solution was black after 5 minutes of running time. The acid strength was maintained during the boil out.

Upon completion of the run, the tube was entirely clean. The viscous solution contained 11% solids by volume. It was boiled down to a concentration of 53% $P_2O_5$, at which time the total solids were 16%.

In actual application, under these circumstances the evaporator could be put back on stream without the necessity of stopping to dump the cleaning acid. As well, there is no acid loss.

*Example IV*

A long tube evaporator equipped with Karbate tubes which had been used for concentrating wet process phosphoric acid for about one week had begun to lose efciency although it was still operating acceptably. This evaporator and system was drained of phosphoric acid and then filled with a predetermined quantity of 54% $P_2O_5$ clarified product acid. Sufficient water was then added to the evaporator to reduce the concentration to about 40% $P_2O_5$ and to bring the liquid level to the top of the evaporator tubes. A vacuum of about 100–200 millimeters Hg was impressed on the system and steam was introduced into the steam chest to bring the acid to a vigorous boil. Water was continuously added to replace that lost by evaporation. After about 12 hours of boiling, the steam was shut off, the vacuum broken and the acid was drained from the evaporator. The head of the evaporator was then removed and the tubes were thoroughly inspected. Almost all of them were clean although a few contained small deposits which could be dislodged by flushing with water under pressure. None of the tubes were broken or damaged in any way by the boil-out treatment.

The procedure used in Example IV was followed, except that about six of the Karbate tubes in the evaporator had been replaced with Ni-o-nel metal tubes. When the boil-out procedure was complete, inspection of all of the tubes revealed that virtually all deposit had been removed.

Numerous runs have been made according to the present method, generally at temperatures of 150–170° F. under a slight vacuum.

The present method of cleaning evaporator tubes greatly reduces the down-time from that normally encountered when the tubes must be cleaned by grinding. Because of this, it is possible to clean the system at frequent intervals without entailing appreciable loss of time. In fact, with an evaporator designed to process slightly more acid than the plant can produce, it is possible to boil out the tubes at intervals of about 7 or 8 days without any loss of production. This makes it possible to maintain the efficiency of the evaporator at about the maximum.

The advantages of the present invention are obvious but include, among others, the following:

(1) The small amount of time required for boil-out permits it to be done frequently, which maintains the evaporator efficiency high;

(2) There is no damage to the brittle evaporator tubes in the present method;

(3) No contaminants are introduced into the system;

(4) The success of the procedure is totally independent of the material of which the tubes are made.

We claim:

1. A method for removing deposits consisting essentially of metal fluosilicates, sulfates, and phosphates from tubes of an evaporator for concentrating wet process phosphoric acid, said process comprising treating said tubes with a boiling solution of phosphoric acid, said acid solution being unsaturated with scale forming bodies consisting essentially of metal fluosilicates, sulfates, and phosphates and having a $P_2O_5$ concentration within the range of 25–45%, while adding water to maintain the $P_2O_5$ concentration of said boiling acid solution within the aforesaid range.

2. The process of claim 1 in which the $P_2O_5$ concentration of the acid solution is within the range of 38–42%.

3. The process of claim 1 in which the boiling solution of phosphoric acid is maintained under a slight vacuum.

4. The process of claim 1 in which the tubes of the evaporator are made of bonded carbon which is resistant to attack by phosphoric acid.

5. The process of claim 1 in which the tubes of the evaporator are made of a nickel-iron-chrominum-molybdenum alloy.

6. The process of claim 1 in which the tubes of the evaporator are made of a nickel-iron-chromium alloy.

7. The process of claim 1 in which the tubes of the evaporator are made of high grade, corrosion-resistant stainless steel.

References Cited

UNITED STATES PATENTS

| | | | |
|---|---|---|---|
| 1,648,137 | 11/1927 | Larison | 23—165 |
| 1,715,695 | 6/1929 | Cole | 134—41 |
| 1,982,518 | 11/1934 | Howard | 23—165 XR |
| 2,091,898 | 8/1937 | Weber | 23—165 XR |
| 2,987,376 | 6/1961 | Gloss | 23—165 |

MORRIS O. WOLK, *Primary Examiner.*

J. ZATARGA, *Assistant Examiner.*